United States Patent [19]
Hitchcock

[11] Patent Number: 6,134,795
[45] Date of Patent: Oct. 24, 2000

[54] MULTI-PURPOSE HAND TOOL

[76] Inventor: James N. Hitchcock, 16202 Sky Blue La., Houston, Tex. 77095

[21] Appl. No.: 09/087,565

[22] Filed: May 29, 1998

[51] Int. Cl.[7] ................ B43L 7/12; B43L 7/14; G01C 9/02
[52] U.S. Cl. .................................. 33/451; 33/465
[58] Field of Search ............... 33/1 N, 274, 275 R, 33/281, 282, 283, 354, 392, 404, 415, 416, 417, 418, 419, 423, 451, 465, 473, 485, 495, DIG. 21

[56] References Cited

U.S. PATENT DOCUMENTS

| | | | |
|---|---|---|---|
| 160,503 | 3/1875 | Ascough | 33/451 |
| 1,521,980 | 1/1925 | Zook | 33/423 |
| 2,054,420 | 9/1936 | Hochman | 33/495 |
| 3,096,586 | 7/1963 | Albright et al. | 33/465 |
| 3,522,657 | 8/1970 | Metrulis | 33/451 |
| 4,700,489 | 10/1987 | Vasile | 33/451 |
| 4,922,621 | 5/1990 | Maier | 33/451 |
| 5,438,761 | 8/1995 | Krumszyn et al. | 33/451 |
| 5,446,969 | 9/1995 | Terenzoni | 33/473 |
| 5,519,942 | 5/1996 | Webb | 33/451 |
| 5,531,031 | 7/1996 | Green | 33/DIG. 21 |
| 5,894,675 | 4/1999 | Cericola | 33/DIG. 21 |

*Primary Examiner*—G. Bradley Bennett
*Attorney, Agent, or Firm*—Kenneth A. Roddy

[57] ABSTRACT

The invention relates to a hand tool which is capable of functioning as a framing square, a roofing framing square or rafter square, a plumb bob, a level, and a gauge or scribe for straight lines, arcs, or circles. The hand tool preferably includes a body, a plate and a releasable locking member. The body includes first and second ends, first and second sides, a top surface and a bottom surface. The hand tool may include a light source disposed at the first end of the body, a horizontal level vial intermediate the first and second sides, a vertical level vial intermediate the first and second sides, and a straight sliding slot intermediate the first and second sides such that the straight sliding slot transverses the body from the first side to the second side providing an aperture. The plate is pivotally attached to the body by a pivot member. The pivot member is disposed in the straight sliding slot thereby allowing the pivot member to be slidably captured therein. The plate includes an arcuate sliding slot. The releasibly locking member has a locked position and an unlocked position and is disposed in the arcuate sliding slot and the straight sliding slot. The releasable locking member allows variable orientation of the plate with respect to the body in its unlocked position such that the plate is permitted to rotate about the pivot member and slide linearly along the straight sliding slot.

2 Claims, 3 Drawing Sheets

MULTI-PURPOSE HAND TOOL

BACKGROUND OF THE INVENTION

1. Field of the Invention

The invention relates to an apparatus for use in construction of commercial, industrial, and residential buildings, and more particularly, a multi-purpose hand tool which is capable of being used for numerous different tasks.

2. Description of Related Art

During the course of constructing commercial, industrial and residential buildings, various different hand tools are employed. Generally, each tool is used to address one task. For example, during construction of a roof, a construction worker will use a framing square, a rafter square, a level, a gauge, a ruler, a plumb bob, and in some instances, a compass to scribe the cut line for arcs or circles. Because of the number of different tools which must be transported to the work site, and carried by the construction worker, a single hand tool which is capable of being used to address multiple tasks has been sought. For example, a level has been designed which can also function as a ruler by placing markings along the side of the level corresponding to inches and/or centimeters. However, prior to the development of the present invention, there as been no hand tool which is capable of being used as a level, a plumb bob, a ruler, a framing square, roofing framing square or rafter square, and a gauge or scribe for straight lines, arcs, or circles.

SUMMARY OF THE INVENTION

Before the present invention, construction workers were required to use several different hand tools to perform various construction tasks. Because of the unique design of the present invention, construction workers can now carry, and use, one tool to address numerous different tasks.

In one aspect, the invention is directed to a hand tool comprising a body and a plate. The body includes first and second ends, first and second sides, a top surface and a bottom surface. The body also includes a light source disposed at the first end of the body, a horizontal level vial intermediate the first and second sides, a vertical level vial intermediate the first and second sides, and a straight sliding slot intermediate the first and second sides such that the straight sliding slot transverses the body from the first side to the second side.

The plate is pivotally attached to the body by a pivot member. The pivot member is disposed in the straight sliding slot thereby allowing the pivot member to be slidably captured therein. The plate also includes an arcuate sliding slot. A releasable locking member having a locked position and an unlocked position is disposed in the arcuate sliding slot and the straight sliding slot. The releasable locking member allows variable orientation of the plate with respect to the body in its unlocked position such that the plate is permitted to rotate about the pivot member and slide linearly along the straight sliding slot.

A further feature of the hand tool is that the releasable locking member includes a shaft and a thumb nut. The shaft includes an aperture transversing the shaft thereby defining an inner diameter, and an outer diameter. The outer diameter preferably includes threads. Another feature of the hand tool is that the pivot member includes a shaft and a thumb nut identical to the shaft and thumb nut of the releasibly locking member. An additional feature of the hand tool is that the light source is a laser.

The unique design of the hand tool permits a construction worker to use the hand tool as a level, a plumb bob, a ruler, a framing square, roofing framing square or rafter square, and a gauge or scribe for straight lines, arcs, or circles.

BRIEF DESCRIPTION OF DRAWINGS

In the accompanying drawings, wherein like numerals denote identical elements.

While the invention will be described in connection with the preferred embodiments, it will be understood that the invention is not intended to be limited to those embodiments. On the contrary, the invention is intended to cover all alternatives, modifications, and equivalents, as may be included within the spirit and scope of the invention as defined by the appended claims and equivalents thereof.

DESCRIPTION OF SPECIFIC EMBODIMENTS

A hand tool in accordance with the present invention provides the construction worker, or operator, with the ability of performing numerous tasks without the need for separate tools. Broadly, the hand tool includes a body and a plate. The plate is pivotally attached to the body such that the plate is capable of being slidably rotated with respect to the body and slid linearly along a portion of the length of the body. The plate can also be removed so that the body may be used as a level, a plumb bob, and ruler, and the plate, when attached to the body, allows the tool to be used as a framing square, roofing framing square or rafter square, and a gauge or scribe for straight lines, arcs, or circles.

Figure 1:
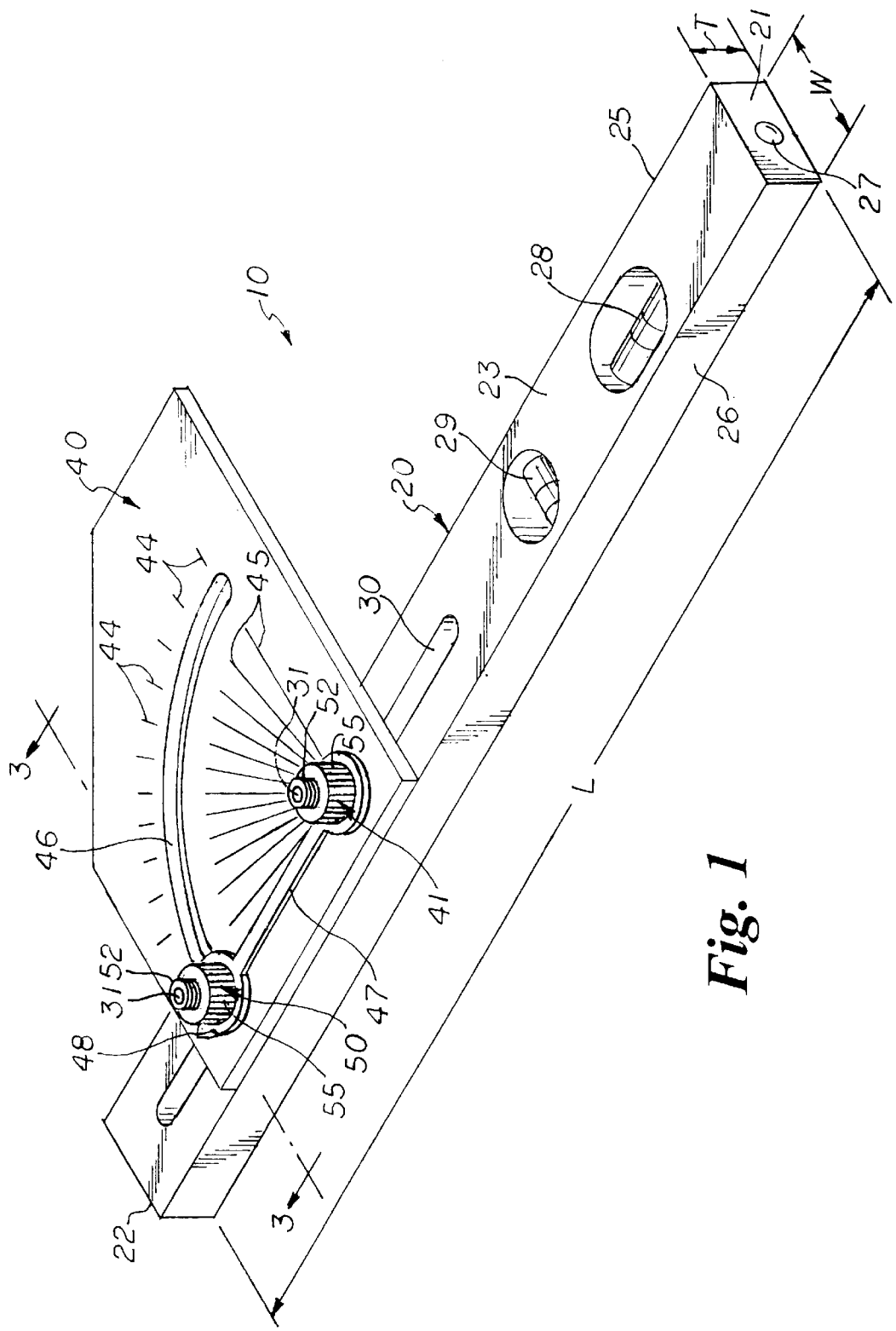
FIG. 1 is a perspective view of one embodiment of a multi-purpose hand tool in accordance with the present invention.
Figure 2:
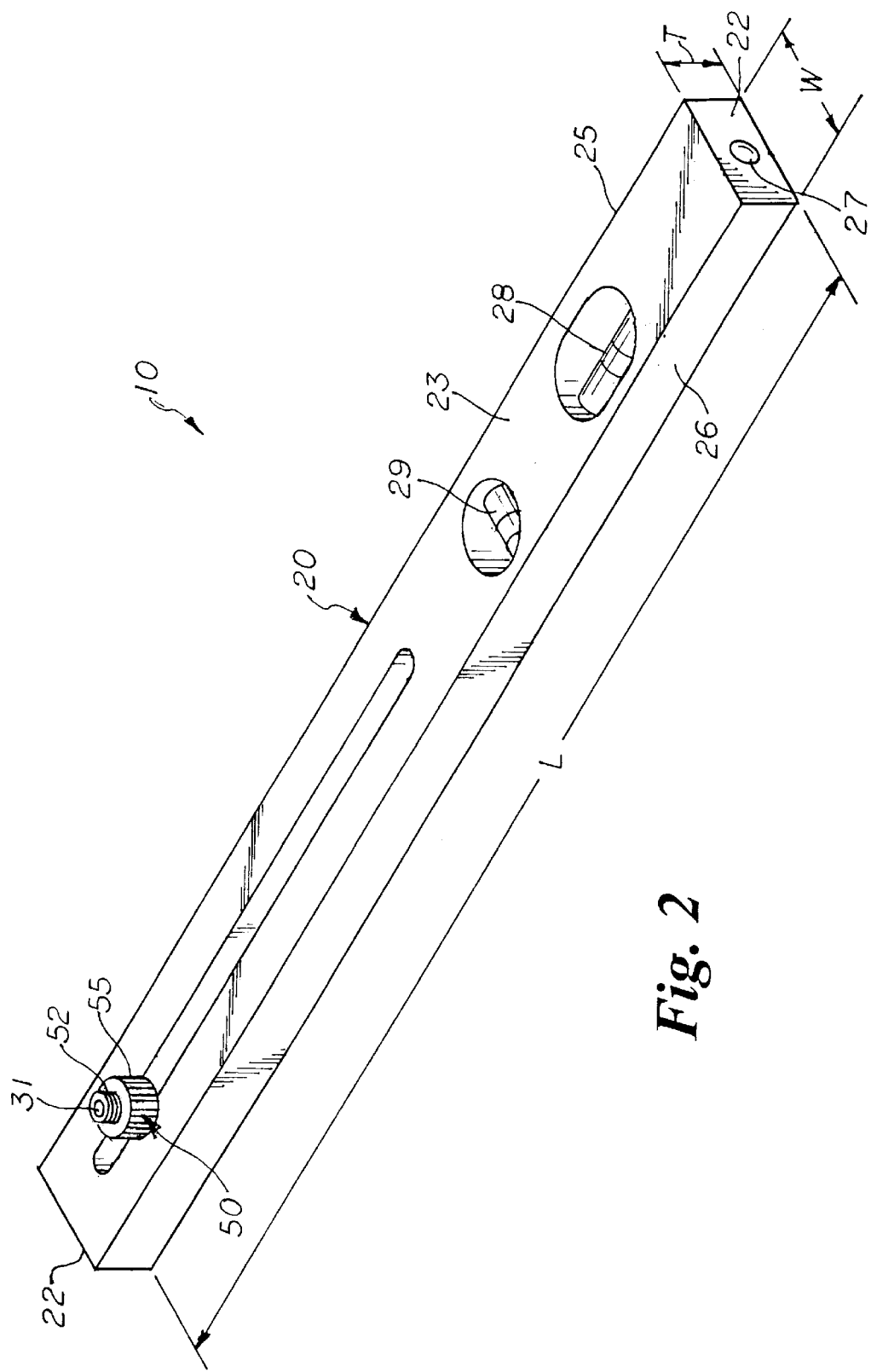
FIG. 2 is a perspective view of the multi-purpose hand tool in accordance with the present invention, shown with the plane removed.

Referring now to FIGS. 1–2, the preferred embodiment of the hand tool 10 include a body 20, a plate 40, and a releasibly locking member 50. The body 20 includes a first end 21, a second end 22, a first side 23, a second side 24 (shown in FIG. 3), a top surface 25, and a bottom surface 26. The distance between the first end 21 and the second end 22 defines a length L of the body 20. The distance between the top surface 25 and the bottom surface 26 defines a width W of the body 20. The distance between the first side 23 and the second side 24 defines a thickness T of the body 20. While it is contemplated that the length L, width W, and thickness T of the body 20 may be any size desired or necessary to achieve the objectives of the operator, preferably, the length L of the body 20 is sixteen inches, the width W of the body 20 is one and one-half inches, and the thickness T of the body 20 is three-quarters of an inch.

The body should also include a light source 27 disposed at its first end 21 thereby providing a light which is preferably emitted in a direction away from, and perpendicular to, the first end 21. The light source 27 may be located at any point along the first end 21 of the body 20. Preferably, the light source 27 is located in the middle of the first end 21 of the body 20.

While it is contemplated that any light source 27 known to persons skilled in the art may be used in conjunction with the hand tool 10, the light source 27 is preferably one which emits a concentrated beam of light on an object such as a wall, floor, or rafter located at distances greater than 2 feet from the hand tool 10. The light source 27 should be capable of remaining on without assistance from the operator of the hand tool 10. Accordingly, the light source 27 preferably includes an on/off switch (not shown) which does not require assistance from the operator of the hand tool 10 for the light source 27 to continue to emit light. Preferably, the light source 27 is any laser known to persons skilled in the art.

The light source 27 provides the operator of the hand tool 10 with the ability to align rafters and other structural components of a building with a reference point to make accurate measurements for cutting the components to be used to join the reference point to a structural component of the building. For example, to make the measurements for a rafter, the hand tool 10 is placed at the reference point and light is emitted from the light source 27 and directed toward the structural component of the building. The light from the light source 27 is placed on the structural component and the hand tool 10 is adjusted until the light intersects the point of the structural component of the building which is to be aligned with the reference point. After alignment of the reference point and the structural component of the building is complete, the operator can use the hand tool 10 to determine the angles at which the rafter must be cut. The light source 27 may also be used to align non-structural components such as cabinets, wallpaper, chair rails, base boards, etc.

As illustrated in FIG. 1 and FIG. 2, the body 20 also includes a horizontal level vial 28 intermediate the first side 23 and the second side 24, a vertical level vial 29 intermediate the first side 23 and the second side 24, and a straight sliding slot 30 intermediate the first side 23 and the second side 24 such that the straight sliding slot 30 transverses the body 20 from the first side 23 to the second side 24. The horizontal level vial 28 and the vertical level vial 29 provide the hand tool 10 with the ability to function as a level. Additional vials oriented at different angles, e.g., a diagonal level vial at a 45° angle to the horizontal level vial 28, may also be used. The straight sliding slot 30 is used in conjunction with a plate 40 to enable the hand tool 10 to function as a framing square, a rafter square and a gauge, as will be explained in greater detail below.

As shown in FIG. 2, the hand tool 10 preferably includes a plate 40 which is pivotally attached to the body 20 by a pivot member 41. The pivot member 41 is disposed in the straight sliding slot 30 thereby allowing the pivot member 41 to be slidably captured therein. While it is contemplated the pivot member 41 may be any structure known to persons skilled in the art which provides rotation of the plate 40, the preferred pivot member 41 is a threaded shaft 52 and thumb nut 55 as described in greater detail below.

The plate 40 also includes seat cut calibrated markings 44, plumb cut calibrated markings 45, and a guide 47 for determining the angle at which the plate 40 is oriented with respect to the body 20 of the hand tool 10 to provide accurate measurements. The seat cut calibrated markings 44 and the plumb cut markings 45 may be present on both sides of the plate. Therefore, the plate 40 may be flipped, and thus customized for the operator's use of the hand tool 10. Preferably, the guide 47 is located between the pivot member 41 and a releasable locking member 50 and extends past the releasibly locking member 50 to provide a pointer 48 to facilitate determining the plumb cut angle using the pointer 48 in conjunction with the plumb cut calibrated markings 45. While it is contemplated that any releasable locking member known to persons skilled in the art may be used, the preferred releasable locking member 50 is a threaded shaft 52 and a thumb nut 55.

The plate 40 may be oriented with respect to the body 20 using the light source 27 as described above to simultaneously determine the angles at which the plumb cuts and the seat cuts need to be made for accurately cutting rafters for a roof. The seat cut is determined by identifying the angle at which the seat cut calibrated markings 44 are parallel with the guide 47. The seat cut calibrated marking 44 which is parallel with the guide 47 is the angle of the seat cut. The plumb cut is determined by identifying the plumb cut calibrated marking 45 which the pointer 48 identifies when the hand tool 10 is in its desired or necessary orientation. Accordingly, the light source 27, in conjunction with the body 20 and the plate 40, provide the operator of the hand tool 10 with the ability to accurately determine the plumb cut and the seat cut simultaneously.

Another advantage of the hand tool 10 is its ability to accurately determine the plumb cut and seat cut of existing rafters without having to remove other structural components, e.g., roofing, to make the measurements. For example, during renovations, new rafters may have to be cut to extend a roof line. These new rafters must include plumb cuts and seat cuts identical to the existing rafters. Accordingly, it is necessary to accurately measure the plumb cut and seat cut of the existing rafters. The straight sliding slot 30, together with the plate 40 and the body 20, allow the hand tool 10 to be placed in areas with limited space, such as above existing rafters. Instead of removing a portion of the existing roof above the rafters to make the measurements, the plate 40 of the hand tool 10 may be positioned such that the body 20 can fit within the space below the existing roofing with the plate 40 oriented along the bottom of the existing rafter so that accurate plumb cut and seat cut measurements can be made.

The plate 40 includes an arcuate sliding slot 46, which, in conjunction with the releasable locking member 50, provides controlled orientation of the plate 40 with respect to the body 20. The releasable locking member 50 includes a locked position and an unlocked position. The releasable locking member 50 is disposed in the arcuate sliding slot 46 and the straight sliding slot 30. The releasable locking member 50 provides variable orientation of the plate 40 with respect to the body 20 in its unlocked position thereby providing the plate 40 to be slidably rotated around the pivot member 41 and slid linearly along the straight sliding slot 30. In its locked position the plate 40 is in a fixed orientation with respect to the body 20.

Figure 3:
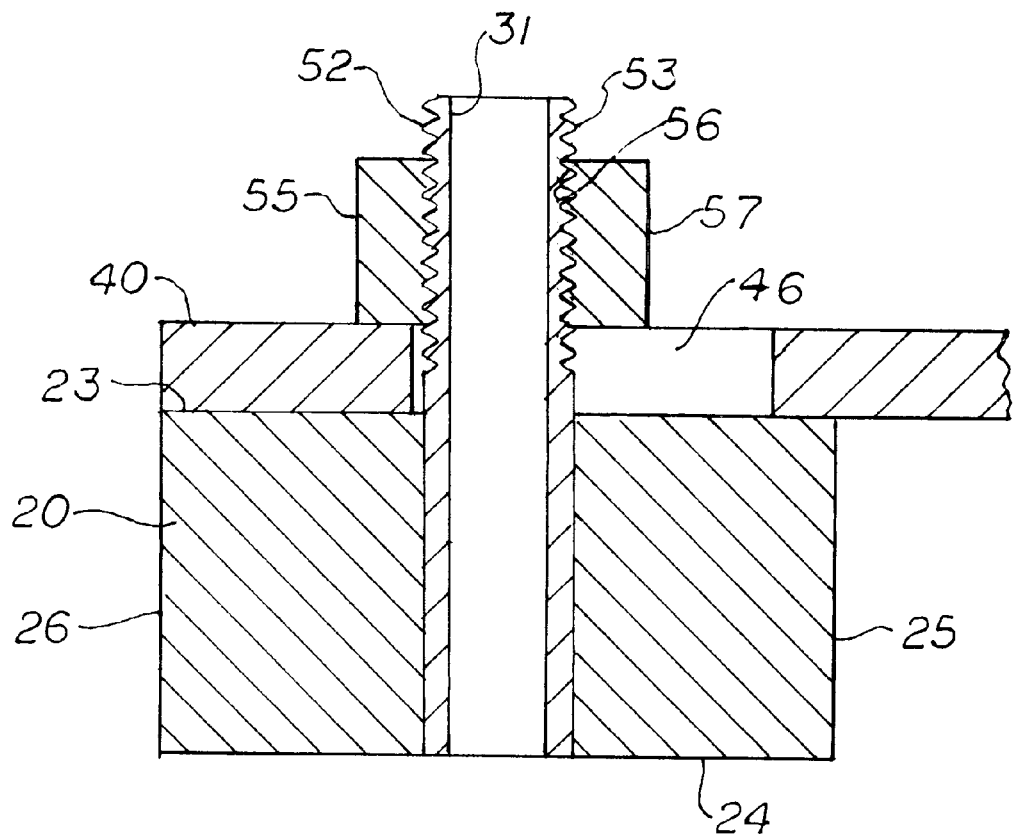
FIG. 3 is a is a cross section view of the multi-purpose hand tool shown in FIG. 2 along line 3—3 in FIG. 2.

Referring now additionally to FIG. 3, the shaft 52 preferably includes an aperture 31 extending through the center of the shaft from end to end. Preferably the inner diameter ID of the aperture 31 is constant throughout the length of the shaft 52. A suspending means (not shown) may be passed through the aperture 31, in the shaft 52 to suspend the hand tool 10 from a rafter or other structure to function as a plumb bob as described below in greater detail. Any suitable suspending means may be used to hang the tool such as a nail, screw, a string or a wire.

The shaft 52 of the releasable locking member 50 has an externally threaded outer surface 53 internal threads 56 of the thumb nut 55. The thumb nut 55 should also include a grip surface 57 for facilitating tightening and loosening of the thumb nut 55 to the shaft 52.

The releasibly locking member 50 provides the hand tool 10 with the capability of being adjusted for various uses. In its locked position, the releasibly locking member 50 prevents the plate 40 from sliding linearly along the straight sliding slot 30 and prevents the plate 40 from slidably rotating around the pivot member 41. The releasibly locking member 50 is placed in its locked position by tightening the threads of the thumb nut 55 around the shaft 52.

The releasibly locking member 50 may be placed in its unlocked position by loosening the thumb nut 55, i.e, unscrewing the threads of the thumb nut 55 from the threads of the shaft 52. In its unlocked position, the releasibly locking member 50 provides the plate 40 with the capability of sliding linearly along the straight sliding slot 30 and the slidably rotating around the pivot member 41 to be adjusted to the desired, or necessary, orientation.

The plate 40 may also be oriented in many different positions. For example, the plate 40 may be flipped or rotated thereby reversing the position of the pivot member 41 and the releasibly locking member 50 such that use of the hand tool 10 is customized for the individual operator and/or for the specific use of the hand tool 10 desired by the operator.

The plate 40 may also be removed to allow the tool to function as a plumb bob, as shown in FIG. 2. This is accomplished by removing the thumb nuts 55 from the shafts 52 of the pivot member 41 and the releasable locking member 50, removing the plate 41, reinstalling the thumb nut on the locking member shaft, and inserting a suspension means through the aperture 31 extending through the locking member shaft, and suspending the body 20 therefrom such that the body first end 21 is facing downward to direct the laser light beam onto a surface beneath the body.

The top surface 25 of the body 20 may also be provided with a magnetic strip (not shown) to facilitate attachment of the hand tool 10 to a steel girder, or beam, used in construction; and the bottom surface 26 may be provided with calibrated markings (not shown), i.e., a ruler, for measuring distances and/or for determining a center point, i.e., a centering ruler.

While this invention has been described fully and completely with special emphasis upon a preferred embodiment, it should be understood that within the scope of the appended claims the invention may be practiced otherwise than as specifically described herein.

What is claimed is:

1. A hand tool comprising:

an elongate generally rectangular body including first and second ends, first and second sides, a top surface and a bottom surface, the body having a laser beam light source disposed at the first end of the body, a horizontal level vial intermediate the first and second sides, a vertical level vial intermediate the first and second sides, and a straight sliding slot intermediate the first and second sides that transverses the body from the first side to the second side;

a removable plate pivotally attached to the first side of the body by a pivot member slidably disposed in the straight sliding slot to allow the pivot member and the plate to be slidably positioned at selected locations along the length of the body, said plate including an arcuate sliding slot; and a releasable locking member slidably disposed in said straight sliding slot and having an externally threaded shaft portion extending through said arcuate sliding slot with a thumb nut threadedly engaged thereon movable between a locked position and an unlocked position to allow linear sliding movement of said plate and said locking member along said straight sliding slot and variable rotation of the plate about said pivot member with respect to the body in said unlocked position and to releasably secure said plate to said body at selected rotated positions in said locked position;

said locking member shaft having an aperture extending longitudinally through its center adapted to receive suspension means for suspending said body therefrom such that said body first end may be faced downward to direct said laser light beam onto a surface beneath said body first end in a suspended position.

2. A multi-purpose hand tool convertible for use as a plumb bob, comprising:

an elongate generally rectangular body including first and second ends, first and second sides, a top surface and a bottom surface, the body having a laser beam light source disposed at the first end of the body, a horizontal level vial intermediate the first and second sides, a vertical level vial intermediate the first and second sides, and a straight sliding slot intermediate the first and second sides that transverses the body from the first side to the second side;

a pivot member slidably mounted in said sliding slot and having a threaded shaft portion extending outwardly therefrom with a first thumb nut threadedly engageable thereon;

a releasable locking member slidably disposed in said straight sliding slot and having an externally threaded shaft portion extending outwardly therefrom with a second thumb nut threadedly engageable thereon, said locking member having an aperture extending through its center; and a removable plate having an aperture for receiving said pivot member shaft portion and an arcuate slot for receiving said locking member externally threaded shaft portion;

said plate being pivotally attached to the first side of the body by installing said threaded shaft portion of said pivot member through said aperture in said plate and threadedly engaging said first thumb nut thereon to allow said pivot member and said plate to be slidably positioned at selected locations along the length of the body, and installing said threaded shaft portion of said locking member in said arcuate sliding slot and threadedly engaging said second thumb nut thereon, wherein said second thumb nut allows linear sliding movement of said plate, said pivot member and said locking member along said straight sliding slot and variable rotation of the plate about said pivot member with respect to the body in an unlocked position and releasably secures said plate to said body it selected rotated positions in a locked position, such that said tool is capable of use as a level, a ruler, a framing square, a roofing framing square, a rafter square, and a scribe for straight lines, arcs and circles; and said tool being converted for use as a plumb bob by removing said first and second thumb nuts from said pivot member shaft and said locking member shaft, respectively, removing said plate, reinstalling said second thumb nut on said locking member shaft, and inserting a suspension means through said aperture extending through said locking member shaft, and suspending said body therefrom such that said body first end is facing downward to direct said laser light beam to a surface beneath said body.

* * * * *